March 12, 1963    R. J. MacDONALD    3,081,196
RUBBING CONTACT MATERIAL
Filed May 4, 1960
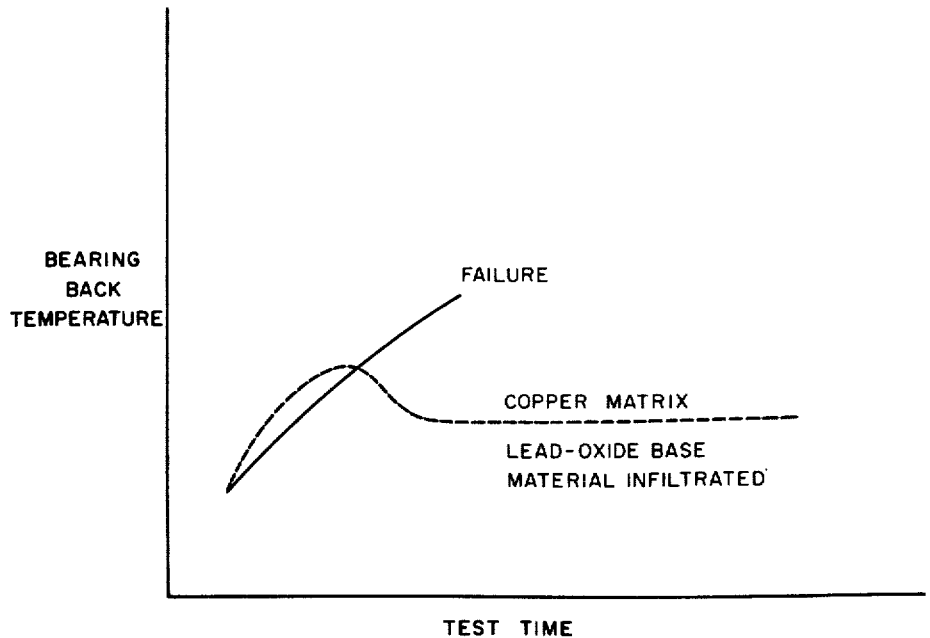
*INVENTOR.*
ROBERT J. MacDONALD
BY
ATTORNEY

United States Patent Office

3,081,196
Patented Mar. 12, 1963

3,081,196
RUBBING CONTACT MATERIAL
Robert J. MacDonald, Cleveland, Ohio, assignor to Clevite Corporation, Cleveland, Ohio, a corporation of Ohio
Filed May 4, 1960, Ser. No. 26,751
17 Claims. (Cl. 117—127)

This invention pertains to a new and novel rubbing contact material which may be used for bearings, piston rings, seals, clutch plates and the like.

The invention more particularly pertains to a device formed by infiltrating into small pores in a matrix a lead oxide base bearing material having a melting point below the melting point of lead oxide. More particularly, this invention pertains to a rubbing contact material formed of a lead oxide base material in which is incorporated one or more other oxides; the other oxides are of such type and their amount is such that the mixture has a lower melting point than that of the lead oxide itself.

Lead oxide at elevated temperatures has a coefficient of friction which makes it attractive for use in some types of rubbing contact materials, and solid film coatings of lead oxide have been bonded to a particular material such as steel. Such a device, however, was useful only in so long as the thin film of lead oxide was present as a coating on the steel. Since the coating was necessarily quite thin and wore off over a fairly short period of time, the life of such a device was limited.

In the present invention a comparatively large amount of material which is predominantly lead oxide with other oxides mixed therein is incorporated into a matrix, such as a copper or a silver matrix, in such manner that there is always present at the rubbing surfaces of the mating materials a rather large amount of the lead oxide based alloy, and because of the depth of the matrix material the rubbing surface material withstands wear over a very long period of time and still functions to provide bearing material at the mating surfaces.

One of the difficulties involved in infiltrating a matrix with a lead oxide based material is to cause the lead oxide based material to infiltrate into the very small pores of the matrix, and to do so without reducing the lead oxide to lead. In order for the lead oxide based mixture to impregnate the matrix it is essential that the infiltrant to some extent wet the material of the matrix. Thus, if the matrix is formed of copper the lead oxide based mixture must be such that at the infiltrating temperatures the infiltrant would wet the surface of the copper and cause the material to flow into the small pores and interstices of the matrix, yet the temperature and other conditions must be such that the lead oxide is not appreciably reduced to lead. In a more technical sense the lead oxide based mixture must have some liquid solubility in the copper. Molten lead oxide at or above a temperature of about 1630° F. readily wets copper and therefore will easily infiltrate a porous copper mass. However, lead oxide has a fairly high coefficient of friction which makes it unsuitable compared to other materials for rubbing contact materials such as bearings. In order to reduce the coefficient of friction, and in a number of instances in order to reduce the viscosity of the mixture at higher temperatures, other oxides have been added to the lead oxide. In each instance, in order to achieve a rubbing contact material which has distinct advantages, it has been necessary to add to the lead oxide another oxide material in such proportions that the mixture has a lower melting temperature than the melting temperature of the lead oxide itself.

In many instances the oxide material which is added to the lead oxide in itself has a higher melting temperature than that of lead oxide. However, the mixtures which are useful for rubbing contact materials always have lower melting temperatures as a mixture than they do as single oxides. Substantially all of the other oxides which are added to the lead oxide to make a mixture which forms a good rubbing contact material are of the type which will form one or more eutectics with lead oxide. However, the proportions used are not limited to the amount necessary to form a eutectic. Many of the mixtures may properly be called ceramics and some of them form glasses, some of which may have a dispersed glassy phase and others of which may have a devitrified phase.

The rubbing contact material of the present invention may or may not have a backing material such as steel, aluminum, plastic or the like. Superimposed on the backing material, if it is used, is a matrix layer of copper or of silver. Known techniques are available for forming the matrix, with or without a backing layer. Reference may be had to Patent No. 2,902,748, Schaefer, issued September 8, 1959, for one example of a technique for applying a layer of sintered copper to a strip of material such as steel. Other examples are available in published articles and in issued patents.

An essential quality for the matrix is that the material of its surface must have a free energy of oxide formation which is more positive than that of lead oxide so that the matrix material does not tend to reduce the lead oxide when the lead oxide based material later is applied to the matrix. Both copper and silver satisfy this requirement. It is possible to use other materials in order to form this matrix if certain precautions are followed. For example: sintered iron particles or sintered aluminum particles may form the matrix if the iron or aluminum powder particles are coated with a material such as copper or silver so that the surface of the matrix which is in contact with the infiltrant has a free energy of oxide formation which is more positive than that of lead oxide. After the matrix has been formed by techniques which are known to the art there is incorporated into the interstices and the pores therein a lead oxide base mixture of at least one other oxide. The type of the other oxide used, and the amount of the other oxide used, is such that the mixture has a lower melting point than that of lead oxide, even though the melting point of the additional oxide may be above that of lead oxide alone.

The lead oxide base mixture may be applied to the matrix by a hot casting technique or it may be applied to the matrix in powder form and heated until it melts and flows into the pores in the matrix.

Sliding surface materials for bearings, seals, piston rings, clutch plates and the like have varying requirements. Thus, for example, a sliding surface bearing should have as low a coefficient of friction as possible; it should have a degree of dirt embeddability; corrosion and oxidation resistance should be satisfactory whether or not externally supplied lubricants are used in conjunction wtih the bearing; its wear rate must be good if the bearing is to be used over a period of time, but in the event the bearing is to be used in a "one shot" device such as a rocket the wear rate may not be of extreme importance; if the bearing is to be used in a high temperature environment its thermal shock resistance must be good; heat conductivity should be good; its thermal expansion should approximate that of surrounding parts; it should be tough but machinable, weigh as little as possible, its porosity usually should be low, and in addition for many applications it should be inexpensive and contain a minimum of critical or strategic materials.

Sliding surface materials for a clutch plate must satisfy many of the above requirements, but usually its coefficient of friction need not be real low; often it does not have to operate in a high temperature; and its ability to embed dirt need not be so high.

Thus, for different services the sliding surface material should have slightly different characteristics, yet in most instances the qualities desired are generally quite similar.

It is an object of the present invention to provide a large family of materials suitable for service as a rubbing contact material.

Another object of the invention is to provide a family of sliding surface materials from which may be selected a given material for use as a sliding surface bearing, a rubbing seal material, or a friction material such as a clutch plate.

For a better understanding of the present invention, together with other and further objects thereof, reference is had to the following description taken in connection with the accompanying drawings, and its scope will be pointed out in the appended claims.

The drawing is a graph showing the relationship between test time and bearing temperature for a copper-lead bearing, and for a typical material which is the subject of the present invention.

Following is Table I which gives a large number of lead oxide base mixtures which fall within the scope of the present invention. At the head of Table I is reference data and for lead oxide per se, which are included for purposes of comparison.

For each of the other oxide additives there is given data as to amount to be added to the lead oxide, eutectic points, melting temperature of the mixture at the eutectic points the melting conditions, and information as to the coefficient of friction of the various mixtures.

In order to obtain uniform test results the samples which yielded the data found in Table I were made of sintered copper without a backing element of steel or the like. The copper powder from which the matrix was made was a homogeneous blend having a wide range of particle sizes, and it was cold compacted at a pressure of 12,000 p.s.i. and sintered in hydrogen at 1840° F. The resulting matrix had about 30% voids by volume.

The infiltrant was mixed in the desired proportions and was heated to its melting temperature, after which the porous copper matrix was immersed in the molten mixture of oxides for sufficient time for the pores of the matrix to be filled. All specimens were water quenched immediately upon leaving the molten bath.

Friction tests were performed at room temperature, with humidity maintained at 40%, and without lubrication other than that supplied by the rubbing surface material itself. A Falex test device was used with a test pin made of low-carbon steel, rotating at 192 r.p.m. and with an applied load ranging from 70 pounds to 566 pounds. The test procedure consisted of maintaining the test load for 5 minutes at a predetermined level, and then advancing to a higher level.

While some of the PbO base mixtures exhibit a coefficient of friction which is probably too high ordinarily to encourage use of the material as a sliding surface bearing material, there are compensating characteristics, and

*Table I*

PbO-BASE MIXTURES

| Additive | Range | Eutectic | Melting T., degrees F. | Melt condition | Coef. of friction Average | Coef. of friction Lowest |
|---|---|---|---|---|---|---|
| PbO | | | 1,630 | Viscous | 0.60 | |
| $SiO_2$ | 1 to 28% | 8% | 1,350 | Fluid | 0.27 | |
| | | 15% | 1,350 | Viscous | 0.27 | 0.23 |
| | | 28% | 1,350 | Very viscous | | |
| $Al_2O_3$ | 1 to 4% | 4% | 1,589 | ___do___ | 0.68 | 0.45 |
| $Bi_2O_3$ | 1 to 49% | 28% | 1,075 | Fluid | 0.38 | |
| PbO—$CrO_3$ | 1 to 25% | 8% | 1,445 | Viscous | 0.31 | 0.22 |
| $V_2O_5$ | 1 to 49% | 13% | 1,400 | Fluid | 0.38 | 0.28 |
| | | 45% | 900 | Viscous | 0.93 | |
| $As_2O_5$ | 1 to 49% | 5% | 1,475 | Fluid | 0.96 | |
| | | 17% | 1,500 | ___do___ | | |
| | | 33% | 1,450 | ___do___ | 0.24 | 0.14 |
| PbO—$MoO_3$ | 1 to 33% | 18% | 1,450 | ___do___ | 0.73 | 0.45 |
| PbO—$WO_3$ | 1 to 45% | 29% | 1,335 | ___do___ | 0.22 | 0.16 |
| $Sb_2O_3$ | 1 to 49% | (Phase Diagram Incomplete). | | ___do___ | 0.23 | 0.17 |
| $B_2O_3$ | 1 to 49% | 12% | 925 | ___do___ | 0.44 | 0.31 |
| $TiO_2$ | 1 to 3% | 3% | 1,500 | ___do___ | 0.70 | |
| $SnO_2$ | 1 to 2% | 1.5% | 1,570 | Very viscous | | |
| $P_2O_5$ | 1 to 7.5% | 5% | 1,500 | Fluid | 0.39 | |
| | 25 to 49% | 9% | 1,550 | | | |
| | | 25% | 1,500 | Fluid | 0.50 | |

| | PbO | $Al_2O_3$ | $SiO_2$ | | | | |
|---|---|---|---|---|---|---|---|
| $SiO_2$ and $Al_2O_3$ | 71 | 1 | 28 | 1,330 | Viscous | 0.33 | 0.22 |
| | 83 | 1 | 16 | 1,300 | ___do___ | | |
| | 85 | 2 | 13 | 1,300 | ___do___ | | |
| | 40 | 1 | 9 | 1,275 | ___do___ | | |
| | 93 | 1 | 6 | 1,275 | ___do___ | | |
| | 91 | 5 | 4 | 1,420 | ___do___ | | |

| | PbO | $B_2O_3$ | $SiO_2$ | | | | |
|---|---|---|---|---|---|---|---|
| $SiO_2$ and $B_2O_3$ | 85 | 11 | 4 | 900 | Fluid | 0.30 | 0.19 |
| | 93 | 5 | 2 | 990 | ___do___ | 0.33 | |

| Additive | Range | | Melting T. | Melt condition | Average | Lowest |
|---|---|---|---|---|---|---|
| $V_2O_5$ and $TiO_2$ | 1 to 10% $V_2O_5$; 1 to 5% $TiO_2$; (No Eutectic) PbO—7.3 $V_2O_5$—3.2 $TiO_2$. | | 1,600 | ___do___ | 0.32 | 0.17 |
| $SiO_2$ and $P_2O_5$ | 1 to 30% $SiO_2$; 1 to 30% $P_2O_5$; (No Eutectic) PbO—12.5 $SiO_2$—2.5 $P_2O_5$. | | 1,425 | Viscous | 0.38 | 0.36 |
| $SiO_2$ and $Fe_3O_4$ | No Phase Diagram Available. PbO—10 $SiO_2$—5 $Fe_3O_4$. | | | Very fluid | 0.34 | 0.27 |
| $Cu_2O$ | 1 to 30% | 18% | 1,260 | Very viscous | 0.31 | 0.18 | also they may be used as friction materials in clutch plates and the like. All of the materials share an advantage which is illustrated by the curve of the drawing.

When the temperature of a typical copper-lead bearing increases above a given critical point the bearing fails. A bearing formed in accordance with the present invention may initially show a higher temperature due to friction than the copper-lead bearing, but after it reaches a given point its temperature drops and is maintained substantially constant with time. This illustrates a very important characteristic of the family of bearing materials herein disclosed.

This is the quality that enables the material to run unlubricated under certain conditions by virtue of the formation of a "glaze," or oxide surface coating, on the mating rotating shaft. As long as this surface film remains intact, and is not disturbed by scoring, etc., the coefficient of friction will be lower than that which would be evident if running against a non-glazed surface. From this we might expect that the mating material would not have as great an effect on frictional behavior with this bearing material. In fact, a few tests have shown that this glaze-forming characteristic of oxide-infiltrated copper will allow satisfactory rubbing even against a stainless steel rotating member. In this instance, the coefficient of friction was as low as that observed with a low-carbon steel shaft. This observation is quite important in view of the fact that most metals are not compatible when rubbing unlubricated against stainless steel, and there is usually considerable evidence of seizing or welding of the components.

Thus it will be seen that the family of lead oxide base mixtures has higher temperature stability than copper-lead materials.

Another advantage apparent through tests on a copper matrix infiltrated with a lead oxide base mixture of other oxides, lies in the fact that the sliding surface material has the ability to run unlubricated in an inert atmosphere as well as in air. When run in argon a lower coefficient of friction has been observed than when run in air. Many materials seem to run better in air than in an inert atmosphere, perhaps due to an oxide film formation while in operation. However, oxidation of copper seems to increase its coefficient of friction.

While the coefficient of friction is an important factor it is not by any means the whole story, and often for a given application one will select a material having a higher coefficient of friction if it has other qualities which are desirable. For example, for many applications the rubbing surface material should resist corrosion. While only a limited number of tests have been run in the standard corrosion-evaluation bath of xylene, lauric acid and nitrobenzene, indications to date are that those oxide mixtures which have been tested are outstanding compared to a copper-lead reference material.

Table II shows the relationship:

*Table II*

CORROSION-EVALUATION RESULTS

| Material | Change in Weight, g./in.²-hr. |
|---|---|
| Cu-Pb | −0.120 |
| CU-(PbO—10 SiO²—5 Al₂O₃) | −0.005 |
| Cu-(PbO—12 B₂O₃) | −0.005 |

Mechanically the lead oxide base materials seem to have an advantage over a copper matrix infiltrated with lead. For example, sintered copper with a 30% lead infiltrant has a tensile strength of 13,000 lbs./sq. in. and a compression strength of 41,000 lbs./sq. in. The same sintered copper matrix with an infiltrant of 85 PbO–10 SiO₂–5Al₂O₃ has a tensile strength of 17,000 lbs./sq. in. and a compression strength of 86,000 lbs./sq. in. The greatly increased compressive strength is a tremendous advantage in bearing applications where loads are apt to run high. An infiltrant of 85 PbO–10 SiO₂–5 Al₂O₃ in an unsintered copper matrix has the same tensile strength and slightly increased compressive strength compared to the sintered copper with a lead infiltrated, showing that it is not essential to use a sintered matrix.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A rubbing contact material comprising: a matrix having a surface of a material whose free energy of oxide formation is more positive than lead oxide and consequently does not tend to reduce lead oxide, and incorporated into said matrix a lead-oxide base mixture of at least one other oxide, the amount of the other oxide being such that the mixture has a lower melting point than that of lead oxide.

2. A rubbing contact material as set forth in claim 1, further characterized in that the said matrix is made of copper.

3. A rubbing contact material as set forth in claim 1, further characterized in that the matrix is made of porous copper and the said mixture is infiltrated into said pores.

4. A rubbing contact material as set forth in claim 1, further characterized in that the said matrix is made of silver.

5. A rubbing contact material as set forth in claim 1, further characterized in that the matrix is made of porous silver and the said mixture is infiltrated into said pores.

6. A rubbing contact material as set forth in claim 1, further characterized in that the said at least one other oxide comprises at least two oxides.

7. A rubbing contact material as set forth in claim 1, further characterized in that the matrix is made of iron particles coated with a surface layer of a material whose free energy of oxide formation is more positive than lead oxide.

8. A rubbing contact material as set forth in claim 1, further characterized in that the matrix is made of iron particles coated with a surface layer of a material whose free energy of oxide formation is more positive than lead oxide, and in that the said surface layer is of a material selected from the group consisting of copper and silver.

9. A rubbing contact material comprising: a matrix having a surface of a material whose free energy of oxide formation is more positive than lead oxide and consequently does not tend to reduce lead oxide, and incorporated into said matrix a mixture of lead oxide and at least one other oxide capable of forming a eutectic with said lead oxide, the amount of said at least one other oxide being between 1 and 49% by weight of said mixture, and being in such amount that said mixture has a lower melting point than that of lead oxide.

10. A rubbing contact material comprising; a matrix having a surface of a material whose free energy of oxide formation is more positive than lead oxide and consequently does not tend to reduce lead oxide, and incorporated into said matrix a lead oxide base ceramic material in an amount such that the mixture has a lower melting point than that of lead oxide.

11. A rubbing contact material as set forth in claim 10, further chacterized in that said lead oxide base material includes SiO₂ in an amount between about 1% and 28% by weight.

12. A rubbing contact material as set forth in claim 10, further chacterized in that said lead oxide base material includes As₂O₅ in an amount between about 1% and 49% by weight.

13. A rubbing contact material as set forth in claim 10, further characterized in that said lead oxide base material includes $WO_3$ in an amount between about 1% and 45% by weight.

14. A rubbing contact material as set forth in claim 10, further characterized in that said lead oxide base material includes $Sb_2O_3$ in an amount between about 1% and 49% by weight.

15. A rubbing contact material comprising: a matrix having a surface of a material whose free energy of oxide formation is more positive than lead oxide and consequently does not tend to reduce lead oxide, and incorporated into said matrix a lead-oxide base mixture including about 8% by weight $SiO_2$.

16. A rubbing contact material as set forth in claim 15, further characterized by said matrix being formed of copper.

17. A rubbing contact material comprising: a matrix having a surface of a material whose free energy of oxide formation is more positive than lead oxide and consequently does not tend to reduce lead oxide, and incorporated into said matrix a lead-oxide base mixture, including $SiO_2$ in an amount between 1% and 28% by weight.

References Cited in the file of this patent

UNITED STATES PATENTS

| | | |
|---|---|---|
| 2,198,253 | Koehring | Apr. 23, 1940 |
| 2,294,404 | Hensel et al. | Sept. 1, 1942 |
| 2,706,693 | Haller | Apr. 19, 1955 |

OTHER REFERENCES

Metal Progress, November 1947, vol. 52, pages 819–823.

Lubrication, March 1957, vol. 9, No. 3, page 36.

Sliney: NASA Memorandum 3–2–59E, February 1959, 22 pp.

UNITED STATES PATENT OFFICE
CERTIFICATE OF CORRECTION

Patent No. 3,081,196

March 12, 1963

Robert J. MacDonald

It is hereby certified that error appears in the above numbered patent requiring correction and that the said Letters Patent should read as corrected below.

Column 3, in Table I, under Additive line 2 for "$SiO_3$" read $SiO_2$.

Signed and sealed this 1st day of October 1963.

(SEAL)
Attest:

ERNEST W. SWIDER
Attesting Officer

DAVID L. LADD
Commissioner of Patents